July 19, 1960 W. E. FOLKERTS 2,945,392
RESILIENT BALL RETURN
Filed March 2, 1959
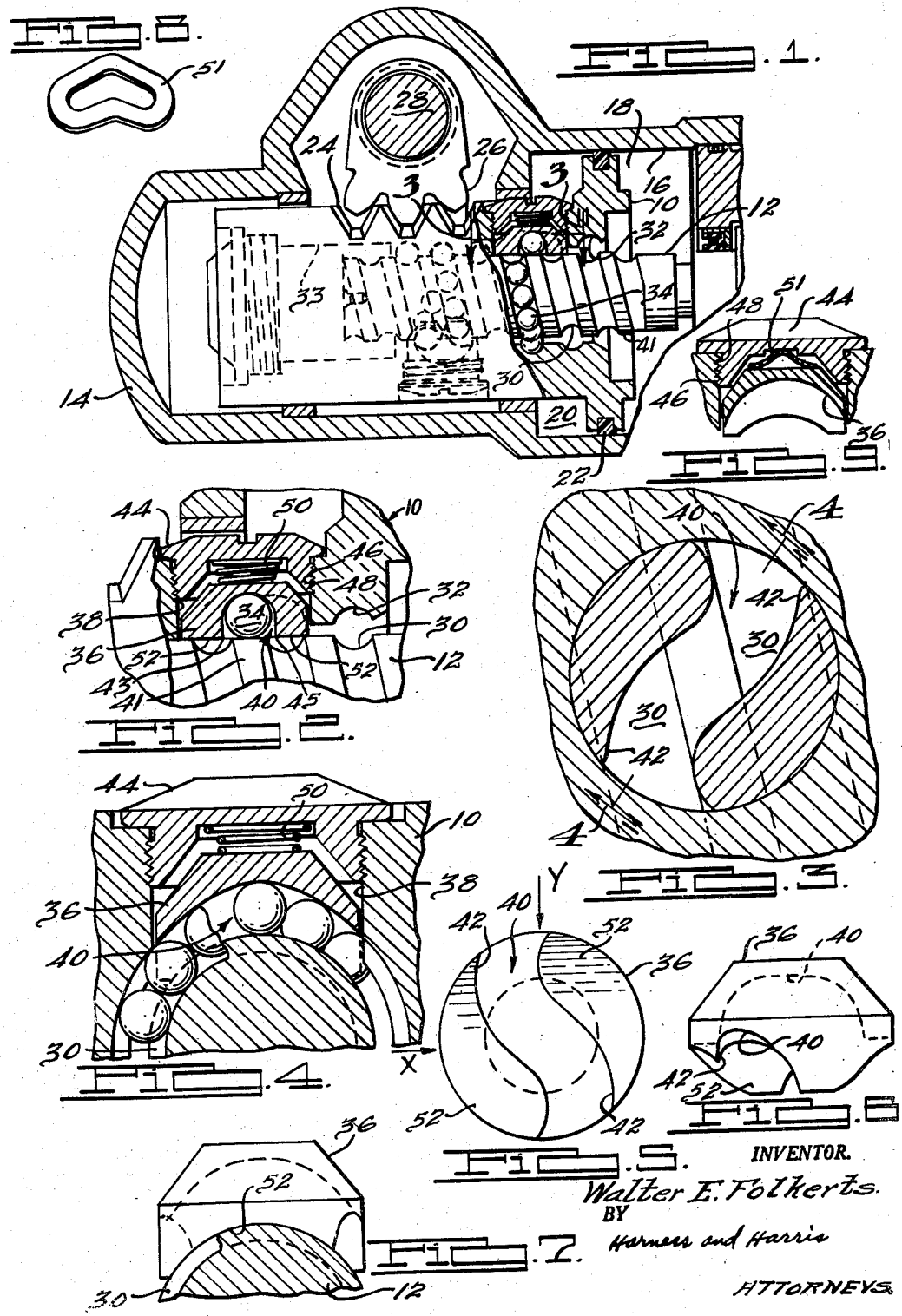
INVENTOR.
Walter E. Folkerts.
BY Harness and Harris
ATTORNEYS United States Patent Office 2,945,392
Patented July 19, 1960

2,945,392

RESILIENT BALL RETURN

Walter E. Folkerts, Hazel Park, Mich., assignor to Chrysler Corporation, Highland Park, Mich., a corporation of Delaware Filed Mar. 2, 1959, Ser. No. 796,375

10 Claims. (Cl. 74—459)

This invention relates to power steering units having ball bearing mounted power steering shafts and pistons and in particular to a resiliently mounted ball bearing recirculator.

In the use of conventional types of ball bearing recirculators in power steering units, the manufacturing tolerances of a great many of the parts of the power steering units must be kept to exceedingly close limits to prevent jamming of the ball bearings by excessive frictional contact of the ball recirculating means and the ball bearings as they move therethrough. These exceedingly close manufacturing tolerances are not easily obtained and, therefore, the rejection rate on the presently existing mass produced power steering units is very high.

A principal object of applicant's invention is to provide a resiliently positioned ball bearing recirculator means which is free to move or float within certain limits within its mounting and adjust itself to meet manufacturing imperfections or variations in dimensions in either the ball bearings, the shaft, or the piston into which the shaft is threaded.

Another object is to provide a novel S-shaped crossover channel in said recirculator wherein the ends of the channel have portions tangential to the threads in the shaft.

These objects are accomplished in the present invention by providing an aperture in the threaded bore forming wall of the power steering piston and inserting in this aperture a ball bearing recirculator means which is resiliently held by a spring against the power steering shaft which is threaded on ball bearings into the bore of the piston. A retaining plug which is threadedly received in the aperture is screwed down toward the ball bearing recirculator to slightly compress said spring between the recirculator and the retaining plug to constantly urge the recirculator against the shaft. By mounting the recirculator in this manner it is adjustable in all directions, within limits, to conform to the path which the balls themselves tend to follow, and the manufacturing imperfections as aforesaid do not increase the frictional resistance of the recirculator to the passage of balls through the crossover channel therein. To further reduce friction on the balls, the crossover recirculator of the present invention is provided with a novel type of S-shaped crossover channel which allows the balls to enter and leave the channel at either end thereof tangentially to the axis of the threads at each said end.

Further objects and advantages become apparent from the following description and drawings, in which:

Figure 1 represents a partial cross sectional view of a power steering piston and worm assembly;

Figure 2 represents a cross sectional enlarged view of the ball recirculator of Figure 1;

Figure 3 represents a cross sectional view of the ball recirculator taken along the line 3—3 of Figure 1;

Figure 4 represents a cross sectional view of the ball recirculator taken along the line corresponding to 4—4 of Figure 3;

Figure 5 represents a bottom elevational view of the ball recirculator;

Figure 6 represents a side view of the ball recirculator of Figure 5 taken from the point Y in the direction of the arrow;

Figure 7 represents a side view of the ball recirculator of Figure 5 taken from the point X in the direction of the arrow;

Figure 8 represents an isometric view of an alternate spring; and

Figure 9 represents a cross sectional view corresponding to Figure 4, but, using the spring of Figure 8.

Shown in Figure 1 is a power steering assembly of a piston 10, a power steering worm shaft 12, and a power steering housing 14. The housing 14 is provided with a cylinder bore 16 in which the piston 10 is slidably received. Opposite sides of piston 10 communicate with chambers 18 and 20 formed in said bore by the piston, which chambers are adapted to be alternately filled with fluid under regulated pressures to exert a force upon the piston 10 to drive it in the desired direction. A sealing ring 22 in piston 10 provides a fluid tight seal between chambers 18 and 20. Provided on one portion of piston 10 are teeth 24 which engage teeth 26 of shaft 28 which is operatively connected to the wheels to be turned by the motion of the power steering piston 10 as it moves in cylinder bore 16. A helical thread 30 is provided in shaft 12 and coincides with a helical thread 32 provided in bore 33 of piston 10. Ball bearings 34 are rotatably mounted in the cooperating threads of the shaft and piston and allow shaft 12 to be threaded into the piston in a relatively non-frictional manner.

In this type of power steering unit as in all of the conventional recirculating ball bearing power steering units some means must be provided to cause the ball bearings to return to a preceding piston thread in order to maintain a continuous recirculation of the ball bearings and a driving connection between the piston and worm shaft upon their movement with respect to each other.

As shown in Figure 2, a ball recirculator 36 is loosely nested in an aperture 38 in piston 10 and is provided with a ball crossover channel 40 which opens toward the worm shaft 12 and extends in a transverse fashion across the thread land 41 of the shaft 12 to allow the ball bearings to cross over said thread land to their initial starting point in the thread 32 of piston 10. The specific shape of the ball crossover channel is shown in Figures 3 and 5 and comprises a semi-circular S-shaped groove which is provided at each end with a ball bearing camming face 42 formed from the end wall of said groove and which extends substantially tangentially to the threads of shaft 12 at the point where these threads are immediately adjacent these faces. These tangential faces and the looseness of the recirculator in its aperture 38 reduce the amount of friction developed as the balls are cammed out of the thread 30 of shaft 12 and into the ball crossover channel 40 by allowing the movement of the balls to actually adjust the position of the recirculator and its channel with respect to the most desirable path of movement of the balls.

As shown in Figures 2 and 4 ball recirculator 36 is slidably mounted in aperture 38 in the piston wall and is retained therein with limited movement by retaining means or plug 44 which is provided with threads 46 threaded into threads 48 in aperture 38. A spring 50 of preferably conical helical shape as shown in Figure 2 or of an arcuate spring washer shape 51 as shown in Figures 8 and 9 is mounted between retaining means 44 and ball recirculator 36 and resiliently urges recirculator 36 against the worm 12. Concave surfaces 52 on either side of the channel 40 in recirculator 36 are of a complementary curved shape to shaft 12 and provide smooth seating or bearing surfaces for the ball recirculator as shown in Figure 7. The edges 43 and 45 of the channel 40 are flush with the lands 41 of the threads 30 and are free to slide thereon. It is noted that no portion of the recirculator extends below bearing surfaces 52 to hinder sliding movement of the recirculator on the shaft, however, edges 43 and 45 of the channel and in particular camming face portions 42 of the channel are below the center or mid axis of the ball bearings in the assembled power steering unit.

By resiliently urging recirculator 36 toward shaft 12, manufacturing tolerances in the ball bearings, the shaft, the ball bearing crossover channel, the piston, the retaining means, and the recirculator itself may be compensated for to thereby reduce the probability of frictional interference of any of these parts with the ball bearings and significantly reduce the number of rejects of power steering units in mass production.

I claim:

1. In a power steering unit having a threaded worm shaft threadably mounted in a threaded power steering piston on ball bearings positioned in the threads of said shaft and piston, a ball bearing recirculator positioned on said shaft and forming a ball bearing crossover channel across the land of one thread of said shaft, and spring means engaging said recirculator and resiliently urging it against said worm shaft.

2. In a power steering unit having a threaded work shaft threadably mounted in a threaded power steering piston on ball bearings positioned in the threads of said shaft and piston, a ball bearing recirculator positioned on said shaft and forming a ball bearing crossover channel extending across the land of one thread on said shaft, ball bearing pick up shoulders on said recirculator forming part of said channel and extending toward the threads of said worm shaft and adapted to engage said ball bearings below the mid axis thereof to direct them out of said threads, and spring means engaging said recirculator and resiliently urging it against said worm shaft.

3. In a power steering unit having a threaded worm shaft threadably mounted in a threaded power steering piston on ball bearings positioned in the threads of said shaft and piston, a ball bearing recirculator having a seating surface of a curvature corresponding to that of said shaft and movably positioned on said shaft, groove means in said seating surface of said recirculator forming a ball bearing crossover channel across the land of one thread of said shaft, and spring means engaging said recirculator and resiliently urging said seating surface against said worm shaft.

4. In a power steering unit having a threaded worm shaft threadably mounted in a threaded power steering piston on ball bearings positioned in the threads of said shaft and piston, a ball bearing recirculator having a seating surface of a curvature corresponding to that of said shaft and movably positioned on said shaft, S-shaped groove means in said seating surface of said recirculator forming a ball bearing crossover channel across the land of one thread of said shaft, and spring means engaging said recirculator and resiliently urging said seating surface against said worm shaft.

5. In a power steering unit having a threaded worm shaft threadably mounted in a threaded power steering piston on ball bearings positioned in the threads of said shaft and piston, a ball bearing recirculator having a seating surface of a curvature corresponding to that of said shaft and movably positioned on said shaft, S-shaped groove means in said seating surface of said recirculator forming a ball bearing crossover channel across the land of one thread of said shaft, the longitudinal axis of each end of said groove means being substantially tangential to the thread in said shaft, and spring means engaging said recirculator and resiliently urging said seating surface against said worm shaft.

6. In a power steering unit having a threaded worm shaft threadably mounted in the threaded bore of a power steering piston on ball bearings positioned in the threads of said shaft and piston, an aperture through the wall of said piston, a ball bearing recirculator loosely nested in said aperture and having therein a ball bearing crossover channel extending across the land of one thread of said worm, ball bearing pick up shoulders on said recirculator at each end of said channel and providing at each said end a ball camming face extending substantially tangentially to said threads and adapted to engage said ball bearings below the mid axis thereof to cam them out of said threads and into said channel, said recirculator being adjustable with respect to the threads in said shaft by movement of said ball bearings in said channel and against said camming faces, and spring means engaging said recirculator and resiliently urging it against said worm shaft.

7. In a power steering unit having a threaded worm shaft threadably mounted on ball bearings in the threaded bore of a power steering piston wherein said bearings are rotatably nested in the threads of said shaft and piston bore, an aperture in said piston extending through the wall thereof and through the threads in said bore, a ball bearing recirculator slidably nested in said aperture and having a bearing surface slidably contacting said shaft, a ball bearing crossover channel in said surface extending across the land of one of said threads in said shaft, retaining means on said piston, and spring means urged against said recirculator by said retaining means for resiliently urging said bearing surface against said shaft.

8. In a power steering unit having a threaded worm shaft threadably mounted on ball bearings in the threaded bore of a power steering piston wherein said bearings are rotatably nested in the threads of said shaft and piston bore, an aperture in said piston extending through the wall thereof and through the threads in said bore, a ball bearing recirculator loosely nested in said aperture and having a seating surface slidably contacting said shaft, a ball bearing crossover channel in said surface extending across the land of one of said threads in said shaft, said recirculator being adjustable with respect to the threads of said shaft by movement of said ball bearings in said channel, retaining means secured in said aperture of said piston, and spring means in said aperture urged against said recirculator by said retaining means for resiliently urging said seating surface against said shaft.

9. In a power steering unit having a threaded worm shaft threadably mounted in a threaded bore of a power steering piston on ball bearings positioned in the threads of said shaft and piston, an aperture through the wall of said piston, a ball bearing recirculator loosely nested in said aperture and having therein a ball bearing crossover channel extending across the land of one thread of said worm, bearing surfaces on said recirculator on either side of said channel therein, said surfaces having a common radius of curvature corresponding to the radius of curvature of said shaft and slidably resting on the lands of the threads therein, ball bearing pick up shoulders on said recirculator at each end of said channel and providing at each said end a ball camming face extending substantially tangentially to said threads and adapted to engage said ball bearings below the mid axis thereof to cam them out of said threads and into said channel, said recirculator being adjustable with respect to the threads in said shaft by movement of said ball bearings in said channel and against said camming faces, and spring means engaging said recirculator and resiliently urging it against said worm shaft.

10. In a power steering unit having a threaded worm shaft threadably mounted in a threaded power steering piston on ball bearings positioned in the threads of said shaft and piston, a ball bearing recirculator positioned on said shaft and forming an S-shaped ball bearing crossover channel extending across the land of one thread of said shaft, said channel having opposite ends extending tangentially to the threads in said shaft, ball bearing pickup shoulders on said recirculator forming part of said channel and extending toward the threads of said worm shaft and adapted to engage said ball bearings below the mid axis thereof to direct them out of said threads, and spring means engaging said recirculator and resiliently urging it against said worm shaft.

References Cited in the file of this patent

UNITED STATES PATENTS

| | | |
|---|---|---|
| 2,045,811 | Twyman | June 30, 1936 |
| 2,322,000 | Douglass | Jan. 15, 1943 |
| 2,343,507 | Hoffar | Mar. 7, 1944 |
| 2,784,611 | Davis | Mar. 12, 1957 |
| 2,828,721 | Folkerts | Apr. 1, 1958 |